United States Patent
Neubauer et al.

(10) Patent No.: US 7,024,722 B2
(45) Date of Patent: Apr. 11, 2006

(54) FIXING DEVICE FOR A WINDSCREEN WIPER SYSTEM

(75) Inventors: Achim Neubauer, Sinzheim-Vormberg (DE); Peter Kalchschmidt, Bruchsal Untergromb (DE); Jochen Moench, Sinzheim (DE); Heiko Sponar, Rastatt (DE)

(73) Assignee: Robert Bosch GmbH, Stuttgart (DE)

( * ) Notice: Subject to any disclaimer, the term of this patent is extended or adjusted under 35 U.S.C. 154(b) by 522 days.

(21) Appl. No.: 10/149,809

(22) PCT Filed: Sep. 26, 2001

(86) PCT No.: PCT/DE01/03693

§ 371 (c)(1),
(2), (4) Date: Aug. 29, 2002

(87) PCT Pub. No.: WO02/34585

PCT Pub. Date: May 2, 2002

(65) Prior Publication Data

US 2003/0074761 A1    Apr. 24, 2003

(30) Foreign Application Priority Data

Oct. 23, 2000  (DE) ................ 100 52 497
Dec. 15, 2000  (DE) ................ 100 62 617

(51) Int. Cl.
*B60S 1/06*    (2006.01)
*B60S 1/04*    (2006.01)

(52) U.S. Cl. ............... 15/250.31; 15/250.3; 296/96.17; 403/268; 403/265; 156/60

(58) Field of Classification Search ............... 15/250.3, 15/250.31; 296/96.17, 96.15; 403/268, 403/265; 156/307.3, 91, 307.1, 60; 29/428
See application file for complete search history.

(56) References Cited

U.S. PATENT DOCUMENTS

| | | | | |
|---|---|---|---|---|
| 3,978,542 | A * | 9/1976 | VAN Eekelen et al. ... | 15/250.3 |
| 4,765,019 | A * | 8/1988 | Ochino .................... | 15/250.19 |
| 4,783,876 | A * | 11/1988 | Souma et al. ............ | 15/250.17 |
| 4,900,771 | A * | 2/1990 | Gerace et al. ............. | 524/296 |
| 5,938,536 | A | 8/1999 | Minke | |
| 6,004,425 | A * | 12/1999 | Born et al. ................. | 156/333 |
| 6,375,136 | B1 * | 4/2002 | Bruemmer et al. ......... | 248/200 |
| 6,630,534 | B1 * | 10/2003 | Tanaka et al. .............. | 524/590 |

FOREIGN PATENT DOCUMENTS

| | | | |
|---|---|---|---|
| DE | 198 33 089 | | 9/1999 |
| DE | 100 16 086 A | | 10/2000 |
| EP | 0359733 | * | 3/1990 |
| EP | 0 532 384 A | | 3/1993 |
| FR | 2621287 | * | 4/1989 |
| WO | 00 18621 A | | 4/2000 |

* cited by examiner

*Primary Examiner*—Gary K. Graham
(74) *Attorney, Agent, or Firm*—Michael J. Striker

(57) ABSTRACT

The invention concerns a fastening for a windshield wiper system on a vehicle body, in particular for motor vehicles, whereby the windshield wiper system is composed of a premanufactured assembly having at least one fastening site arranged on it. It is provided that the at least one fastening site of the windshield wiper system (32) is bonded in each case with a fastening site arranged accordingly on the vehicle body (10).

21 Claims, 3 Drawing Sheets

FIXING DEVICE FOR A WINDSCREEN WIPER SYSTEM

BACKGROUND OF THE INVENTION

The invention concerns a fastening for a windshield wiper system.

The fastening of windshield wiper systems, in particular for motor vehicles, to the vehicle body by means of a screw connection using using vibration-damping elements is known. The windshield wiper systems are generally supplied to the automobile manufacturer as preassembled assemblies for installation in the motor vehicle. The preassembled assembly comprises a sheet bar outfitted with an appropriate mounting lug on each of its ends, and a drive motor that is interconnected with the wiper shafts supported on the sheet bar via a coupling linkage. The drive motor itself is also secured to the sheet bar and is outfitted with a mounting lug for fastening the windshield wiper system to the vehicle body. The fastening of the windshield wiper system is screwed to the vehicle body via the mounting lugs arranged on the windshield wiper system. To improve assembly of the windshield wiper system, either the nuts or the screws are welded onto the body of the vehicle. Vibration-damping elements such as damping rubbers or the like are arranged between the vehicle body and the fastening points of the windshield wiper system to dampen or prevent the transmission of vibrations. The mounting lugs are arranged on the preassembled windshield wiper system in such a fashion that they form a relatively large triangle in order to increase the stiffness of the system. The disadvantage of the known type of fastening of windshield wiper systems to the vehicle body, on the one hand, is the relatively great amount of manual effort required to install the windshield wiper system on the vehicle body and, on the other hand, the large material expenditure required for this purpose in the form of nuts, screws, washers, damping rubbers and the like. Additionally, assembly requires that clearance be available for the screwdrivers. Furthermore, there is a risk of an undesired separation or detachment of the screw connection resulting from the vibrations occurring during driving. A detachment of the screw connection unavoidably results in impaired performance of the windshield wiper system.

SUMMARY OF THE INVENTION

In contrast, the fastening, according to the invention, of a windshield wiper system to a vehicle body offers the advantage that the expense of installation of the windshield wiper system to the vehicle body as well as the number of individual parts required for the installation, such as nuts, screws, washers, damping rubbers and the like, are greatly reduced. Due to the fact that the at least one fastening site of the windshield wiper system is bonded with one fastening site (attachment site) arranged accordingly on the vehicle body in each case, a rapid and secure installation of the windshield wiper system on the vehicle body is advantageously achieved. The clearance required for the screwdrivers needed for a screw connection is no longer necessary. A further advantage of the means of attaining the object of the invention, according to the invention, is the fact that the hardened bonding agent assumes the damping function of the vibration-damping elements described in the related art. Rubber bushings or other vibration-damping elements are eliminated which reduces material costs.

The invention is described in greater detail below in an exemplary embodiment with reference to the associated drawings.

DESCRIPTION OF THE PREFERRED EMBODIMENTS

Figure 1:
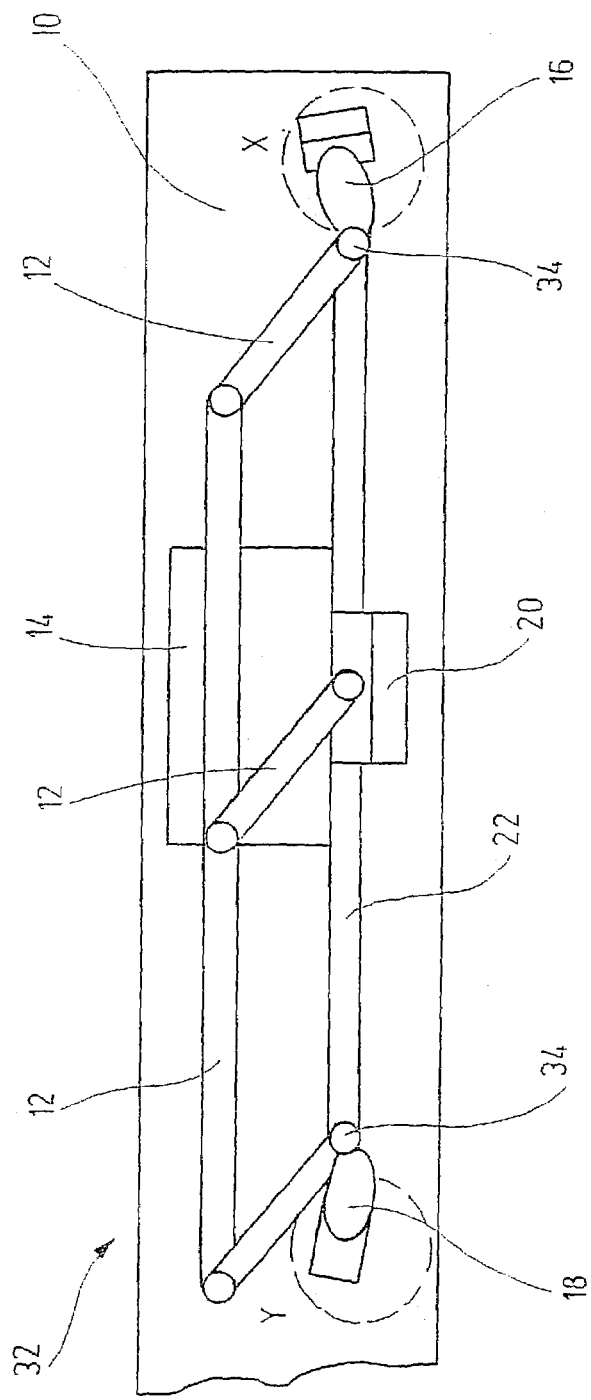
FIG. 1 is a top view showing the fastening, according to the invention, of a windshield wiper system to a vehicle body.

The attachment of a windshield wiper system 32 to a vehicle body 10 is shown schematically in FIG. 1. The windshield wiper system 32—which is in itself known—comprises a sheet bar 22 outfitted on each of its ends with an appropriate fastening site 16 and 18. On the one hand, a drive motor 14 is secured to the sheet bar 22 via a third fastening site 20, and, on the other hand, a fastening of the windshield wiper system 32 to the vehicle body 10 takes place via the third fastening site 20. The drive motor 14 is interconnected with the wiper shafts 34 supported on the sheet bar 22 via a coupling linkage 12 to activate the windshield wipers. The windshield wiper systems 32 are preassembled and then installed in the appropriate vehicle as an assembly.

Figure 4:
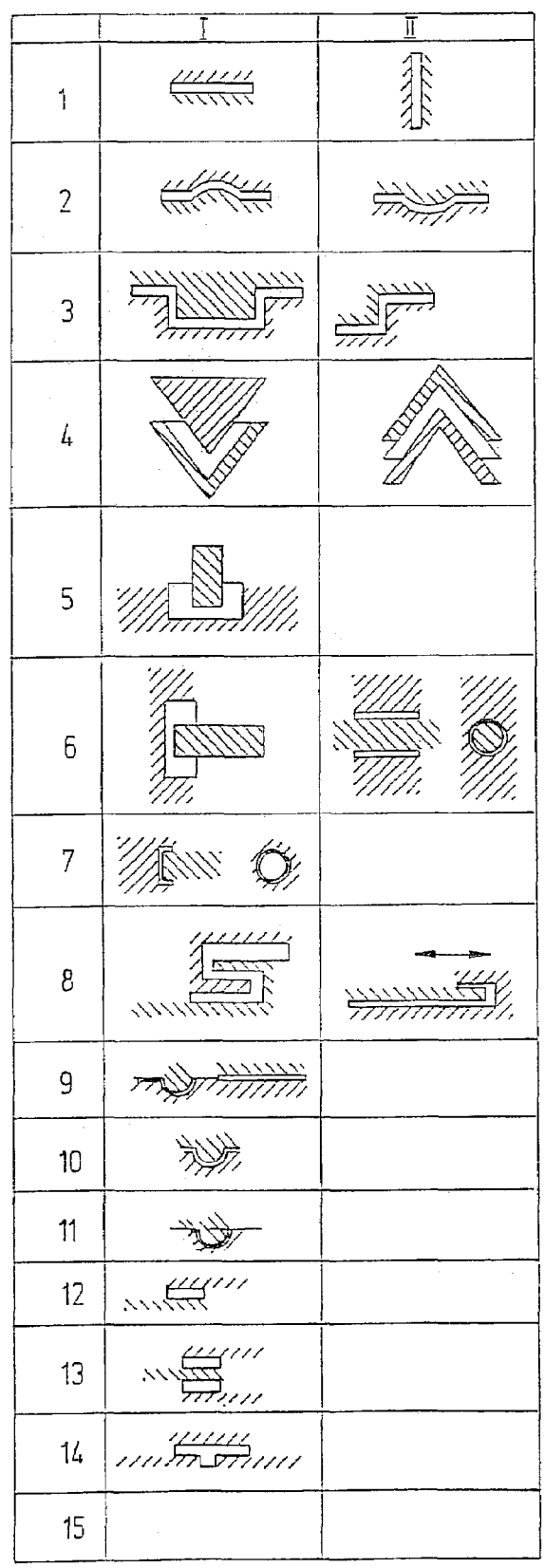
FIG. 4 shows a schematic illustration of the bonded connection in the case of various surface shapes and attachment sites.

The fastening of the windshield wiper system 32, in particular to the vehicle body 10 of motor vehicles, takes place according to the invention in that the fastening sites of the windshield wiper system 32 are bonded with a fastening site (attachment site) arranged accordingly on the vehicle body 10 in each case. Adhesion is a bonded connection. In order to increase its continuous loadability, it is practical to produce a positive connection in addition to the bonded connection for certain loading directions. In terms of the bonding, this means that pressure loads in particular are to be transmitted via the bonding layer. Descaling and tensile loads on the attachment sites are prevented to the greatest extent by means of the appropriate spacial arrangment as well as an additional positive construction of the connection. The table presented in FIG. 4 shows various surface shapes and attachment sites of a bonding having an additional positive connection.

The work pieces shown with the shading "A" represent the windshield wiper system 32, for example, while the shading "C" represents the vehicle body 10, for instance. The bonding agent between the respective formed parts is indicated with "B". Different arrangements of the work pieces are illustrated accordingly in columns I and II.

Shown in the respective rows of the table are different surface shapes, different forms of attachment, and different numbers of attachment sites of the bonded and positive connection of various work pieces. Different surface shapes of work pieces are shown in rows 1 through 4. A smooth surface shape is shown in row 1. A round, oval, concave/convex surface shape is shown in row 2. An angular surface shape is shown in row 3, and a triangular surface shape is shown in row 4. Different forms of attachment sites are shown in rows 5 through 11. The embedding of one work piece into another work piece is shown in row 5. A pin and bore connection is shown in row 6. A circular connection is shown in row 7. A folded seam connection is shown in row 8. A ripple and sheet connection is shown in row 9. A half ball and spherical cup connection is shown in row 10, and a ball and socket connection is shown in row 11. The number of attachment sites is shown in rows 12 through 15. A single attachment is shown in row 12, a double attachment in row 13, and a three-fold attachment is shown in row 14. Row 15 represents a multifold attachment and is not shown in further detail. The variants shown in the table represent possible attachment variants of the fastening sites 16; 18; 20 between a windshield wiper system 32 and a vehicle body in accordance with the respective conditions.

It has proven particularly advantageous to design the first fastening site 16 between the windshield wiper system 32 and the vehicle body 10 as fixed bearing without a corresponding compensation of tolerance, while the second fastening site 18 is designed with a single-axis compensation of tolerance, and the third fastening site 20 is designed with a two-axis, planar compensation of tolerance. Any production tolerances of the windshield wiper system 32 and the vehicle 10 that may occur can be offset by means of the corresponding compensations of tolerance of the second fastening site 18 and the third fastening site 20.

Figure 2:
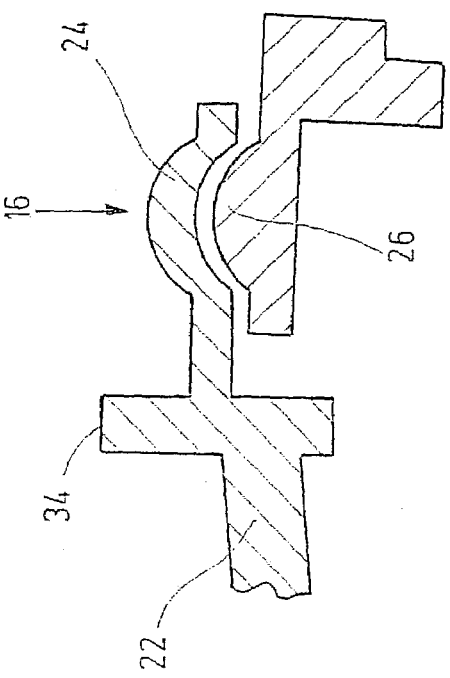
FIG. 2 shows a detail X according to FIG. 1.
Figure 3:
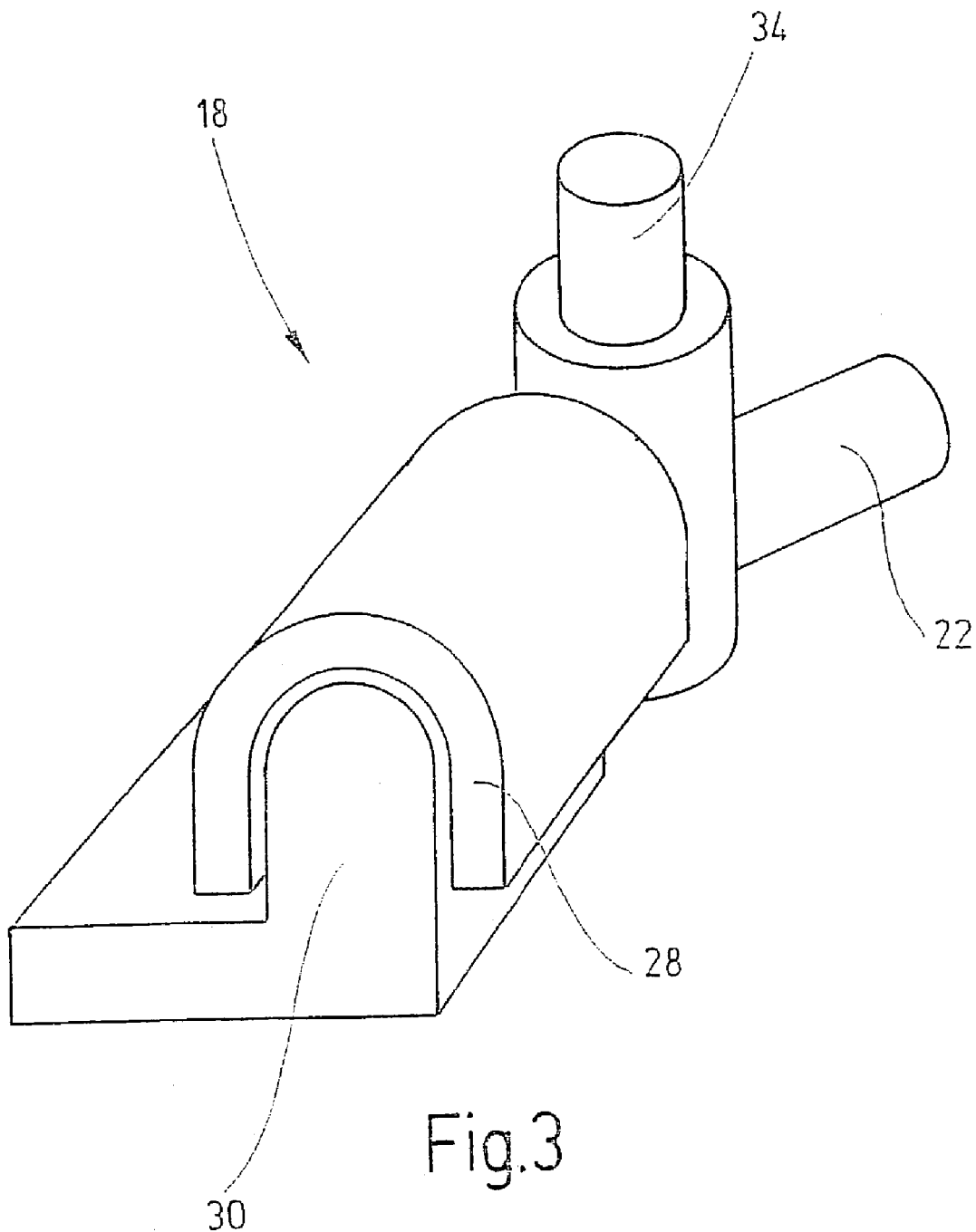
FIG. 3 shows a detail Y according to FIG. 1.

As shown in FIG. 2, the attachment site of the first fastening site 16—designed as fixed bearing—comprises a half ball 26 that has a positive connection with a corresponding spherical cup 24. The fastening site of the windshield wiper system 10 is thereby designed preferably as a spherical cup 24, and the attachment site on the vehicle body 10 is designed preferably as a half ball 26. The attachment site of the second fastening site 18 provided with a single-axis compensation of tolerance comprises, according to FIG. 3, a U-shaped formed part 28 designed with a downwardly open side, which said formed part has a mutual postive connection with a correspondingly designed, U-shaped matching piece 30. The fastening site of the windshield wiper system 32 is thereby designed preferably as a U-shaped formed part 28 having a downwardly open side, and the attachment site on the vehicle body 10 is designed as a U-shaped matching piece 30. The attachment site of the third fastening site 20 designed with a two-axis, planar compensation of tolerance is designed as a flat surface in each case. Due to the design and shape of the individual fastening sites 16; 18; 20 between the windshield wiper system 32 and the vehicle body 10, the windshield wiper system 32 is fixed in exact position during installation. The individual fastening sites 16; 18; 20 between the windshield wiper system 32 and the vehicle body 10 can also be shaped in accordance with the variants shown in the table. It is also feasible to fasten a windshield wiper system 32 to the vehicle body using only two fastening sites, e.g., only by means of the fastening sites 16; 18.

The first fastening site 16 designed as fixed bearing has the highest degree of accuracy in terms of installation position. This accuracy is also decisive for the adjustment of the corresponding wiping ranges of the windshield wipers, and for the precise achievement of the calculated wiping angles under various conditions. In the case of common tandem-pattern wiper systems, the wiper blade moves between the lower edge of the windshield and the A pillar of the motor vehicle. For this reason, the goal is to achieve a higher wiping angle precision on this side of the vehicle. The first fastening site 16—designed as fixed bearing—is therefore arranged on the driver's side on the vehicle body 10. The second fastening site 18—designed with a single-axis compensation of tolerance—is arranged on the vehicle body 10 in the direction of the passenger's side, while the third fastening site 20—designed with a two—axis, planar compensation of tolerance—is arranged on the vehicle body 10 approximately in the middle between the first fastening site 16 and the second fastening site 18.

In order to increase the overall stiffness of the windshield wiper system 32, the fastening sites 16; 18; 20 for the windshield wiper system 32 on the vehicle body 10 are arranged in such a fashion that they form a triangle as viewed in one plane. The stiffness of the windshield wiper system 32 thereby depends on the size of the triangle to be formed between the individual fastening sites 16; 18; 20. The larger the triangle to be formed, the greater the stability of the windshield wiper system.

For the initial fixing into position of the windshield wiper system 32, spacers can be arranged between the windshield wiper system 32 and the vehicle body 10 in the bonding sites of the fastening sites 16; 18; 20 during installation, which said spacers bring the windshield wiper system into a predetermined position, on the one hand, and, on the other, serve to achieve a certain layer thickenss of bonding agent. These spacers must be composed of a vibration-damping material, e.g., elastomer, if they are not to be removed after the bonding agent hardens. If the spacers consist of a non-vibration-damping material, they are removed after the bonding agent hardens.

To adhesively bond the windshield wiper system 32 to the vehicle body 10, a rubber-elastic, polyurethane-based, single-component bonding agent is applied between the respective fastening sites 16; 18; 20 of the windshield wiper system 32 and the vehicle body 10. The bonding agent is thereby applied preferably to the respective fastening sites 16; 18; 20 of the windshield wiper system 32, because they are more accessible. Moreover, these sites have defined bonding surfaces. When the bonding agent is applied to the fastening sites of the vehicle body 10, in particular to the third fastening site 20 designed with a two-axis, planar compensation of tolerance, it can happen that the bonding agent would not be located—or would be only partially located—at the appropriate bonding site due to possible shifting of the respective fastening sites 20 in relation to each other. This would negatively impair the strength of the bonding site.

The bonding agent is applied evenly to the respective fastening sites 16; 18; 20 at approximately 60° C. This takes place by means of injection into the wells of the appropriately designed fastening sites or by means of application of triangular beads in the case of a fastening site with a planar design. Due to the high viscosity of the bonding agent, even at processing temperature, the bonding agent can be applied to the respective fastening sites 16; 18; 20, and the windshield wiper system 32 can then be moved in any fashion during transport. The viscosity is substantially "very viscous" in the processing state, i.e., the viscosity is such that it is capable of being processed with technically achievable pressures in known dosing systems, but it does not drip or smear easily, nor does it deform under its own weight (the bead shape remains constant). The shape and size of the respective fastening sites 16; 18; 20 and, therefore the bonding sites between the windshield wiper system 32 and the vehicle body 10 result from the maximum loads that occur at the fastening sites. The maximum forces are thereby determined when the wiper arms are blocked in various positions and rotated out of the coordinate system of the vehicle in fastening coordinate systems. In this fashion, a distinction can be made between surface-parallel forces and forces perpendicular to these and, therefore, pushing and pulling forces can be determined. The necessary bonding surfaces are calculated based on these forces and the strengths of the bonding agent on the painted surfaces provided on the vehicle body 10. The three-dimensional geometry of the bonding surfaces present in two points is thereby ignored. High safety factors are also taken into consideration in the arrangement of the corresponding bonding surfaces, to minimize the risk of failure even in the case of extreme vehicle stresses and service lifes. A further point to consider in terms of the layout and arrangement of the bonding sites is the guarantee of fail-safe behavior of the fastening sites. This means that the size of the bonding surface on the individual fastening sites 16; 18; 20 between the windshield wiper system 32 and the vehicle body 10 is to be dimensioned so large that, if a bonding of one fastening site 16 or 18 or 20 should detach, the bondings of the other fastening sites are prevented from detaching. This ensures that, if an attachment sites detaches due to the forces occurring during wiping, the other attachment sites are not detached. Detachment of the windshield wiper system 32 is therefore prevented to the greatest extent possible under normal conditions.

The low-viscosity consistency of the bonding agent is also critical to obtaining a predetermined thickness of the bonding agent between the respective fastening sites 16; 18; 20 of the windshield wiper system 32 and the vehicle body 10. The bonding agent is thereby required to be elastic and vibration-damping after it hardens. The bonding agent is applied in such a thickness between the fastening sites 16; 18; 20 of the windshield wiper system 32 and vehicle body 10 that the hardened bonding agent separates the windshield wiper system 32 and vehicle body 10 in terms of vibrational behavior and therefore takes on a corresponding damping function. It is therefore necessary to arrange the layer of bonding agent between the respective surfaces of the fastening sites in such a fashion that the components of the windshield wiper system 32 do not come in contact with the vehicle body 10 and, therefore, vibrations from the windshield wiper system 32 cannot be transmitted into the vehicle. The elastic damping members such as rubber bushings or the like that were common up to now are therefore are eliminated.

The polyurethane-based, elastic bonding agent has a high initial stiffness, and its film-forming time is less than 20 minutes. After hardening, the bonding agent has a hardness of approximately 60 shore (A). As a result, the position of the bonded-on windshield wiper system 32 does not change during subsequent transport on an assembly line, even if the vehicle vibrates and is rotated. Additionally, due to the short film-forming time, the vehicle can be repainted in accordance with the production sequence without additional standstill time to allow the bonding agent to harden.

A further property of the bonding agent lies in the fact that the bonding agent is resistant to water, oil, surfactants, alcohol, ozone, salt and ageing. Resistance to ageing is necessary to ensure a long service life of the bonded connection produced between the windshield wiper system 32 and vehicle body 10. The bonding agent is also required to be resistant to water, oils, surfactants, alcohol, ozone and salts, because the bonding agent can come in contact with these substances. In designing the individual fastening sites 16; 18; 20 between the windshield wiper system 32 and the vehicle body 10, the fact was thereby taken into consideration that fluid media can run off and therefore not have permanent contact with the bonding agent and the bonding site. By preventing permanent contact of fluid media with the bonding agent, impairment of the bonding agent sites can be ruled out to the greatest extent possible, which extends the service life of the bonding. The bonding agent used must also be silicone-free, free of toxic substances, environmentally compatible, not harmful to health, and capable of being applied in a non-dangerous fashion, in order to meet environmental protection requirements.

If it becomes necessary to replace the windshield wiper system 32, a disassembly of the windshield wiper system 32 must take place in such a fashion that the respective fastening sites 16; 18; 20 and the vehicle body 10 are not damaged. This means that the bonding between the respective fastening sites 16; 18; 20 of the windshield wiper system 32 and the vehicle body 10 must be separable. The separation is performed using a vibrating knife with 90° offset blade that is guided between the respective fastening sites 16; 18; 20 of the windshield wiper system 32 and the vehicle body 10. Such tools are available in any workshop for separating adhesively bonded-on windshields from the vehicle body. A new adhesive bonding of the windshield wiper system 32 can take place without a problem on the residue of the bonding agent at the previously separated bonding sites.

The installation of the windshield wiper system 32 on the vehicle body 10 usually takes place by means of a timed production line or an installation line. Due to the design of the individual fastening sites 16; 18; 20 between the windshield wiper system 32 and the vehicle body 10 with the appropriate degrees of freedom and fixed points, it is possible to perform installation using a one-armed robot, because the windshield wiper system 32 can be fixed in position easily on the vehicle body 10. Additionally, the bonding agent can easily be warmed up to the appropriate processing temperature of approximately 600 C and applied to the fastening sites of the windshield wiper system 32 by means of the robot. By using a robot, contact between human and bonding agent during installation of the windshield wiper system 32 is also prevented. To accelerate the hardening of the bonding agent, special systems such as a booster system can also be used. During subsequent installation of the wiper arm, it must be taken into consideration that the installation cannot take place until a sufficient hardening time has passed, i.e., after a film has formed on the bonding agent.

The fastening, according to the invention, of windshield wiper systems to a vehicle body can be carried out for any windshield wiper system available on a vehicle. The means of attaining the object of the invention, according to the invention, can therefore be used for front and rear window wiper systems, headlamps and mirror surfaces. The windshield wiper system can thereby be designed in accordance with its style as a one or two-armed system with or without lifting control, one or two motor systems in tandem-pattern or opposed-pattern.

The advantage of the fastening according to the invention lies mainly in the fact that it is easy to install, the fastening is secure, and the number of individual parts required, the installation space required and the costs are reduced.

What is claimed is:

1. A fastening for a windshield wiper system on a vehicle body, in particular for motor vehicles, whereby the windshield wiper system comprises a premanufactured assembly having at least one fastening site arranged on it, wherein the at least one fastening site of the windshield wiper system (32) is bonded in each case with a fastening site arranged accordingly on the vehicle body (10), wherein a first fastening site (16) formed as fixed bearing comprises a half ball (26) and a matching spherical cup (24) having a positive connection with each other, whereby the fastening site of the windshield wiper system (10) is preferably designed as spherical cup (24), and the attachment site on the vehicle body (10) is designed as half ball (26).

2. The fastening according to claim 1, wherein the windshield wiper system (32) has three fastening sites which are spaced from one another and include the first fastening site (16) between the windshield wiper system (32) and the vehicle body (10) as fixed bearing without a corresponding compensation of tolerance, a second fastening site (18) having a single-axis compensation of tolerance, and a third fastening site (20) having a two-axis, planar compensation of tolerance.

3. The fastening according to claim 2, wherein the third fastening site (20) having a two-axis, planar compensation of tolerance is designed as a flat surface.

4. The fastening according to claim 1, wherein the first fastening site (16) designed as fixed bearing on the vehicle body (10) is situated as close as possible to a wiper shaft (34) of a driver-side wiper arm, a second fastening site (18) on the vehicle body (10) designed with a single-axis compensation of tolerance is situated as close as possible to the wiper shaft (34) of a passenger-side wiper arm, and a third fastening site (20) designed with a two-axis, planar compensation of tolerance is situated as close as possible to the vehicle body (10) in a region of a engine suspension.

5. The fastening according to claim 1, wherein the fastening sites (16; 18; 20) for the windshield wiper system (32) are arranged on the vehicle body (10) in such a fashion that they form the largest possible triangle of forces as viewed in one plane.

6. The fastening according to claim 1, wherein at least one spacer is arranged between respective fastening sites (16; 18; 20) of the windshield wiper system (32) and the vehicle body (10) to obtain a predetermined layer thickness of bonding agent.

7. The fastening according to claim 6, wherein the spacer is composed of a vibration-damping material.

8. The fastening according to claim 1, wherein a high-viscosity bonding agent is used.

9. The fastening according to claim 8, wherein the bonding agent is applied in such a thickness between the respective fastening sites (16; 18; 20) of the windshield wiper system (32) and the vehicle body (10) that the windshield wiper system (32) and the vehicle body (10) are separated from each other in terms of vibrational behavior.

10. The fastening according to claim 1, wherein a bonding agent is applied between the respective fastening sites (15; 18; 20) of the windshield wiper system (32) and the vehicle body (10) is a rubber-elastic, polyurethane-based, single-component bonding agent.

11. The fastening according to claim 1, wherein a bonding agent is applied preferably to the respective fastening sites (16; 18; 20) of the windshield wiper system (32).

12. The fastening according to claim 11, wherein the bonding agent comprises a high viscosity in a processing state at processing temperature, its film-forming time is less than 20 minutes, and it comprises a high initial firmness and, after hardening, a hardness of approximately 60 shore (A).

13. The fastening according to claim 11, wherein the bonding agent is resistant to water, oil, surfactants, alcohol, ozone, salt and ageing.

14. The fastening according to claim 11, wherein the bonding agent is elastic and vibration-damping after it hardens.

15. The fastening according to claim 11, wherein the bonding agent is silicone-free, environmentally compatible, and not harmful to health.

16. The fastening according to claim 1, wherein bondings between the respective fastening sites (16; 18; 20) of the windshield wiper system (32) and the vehicle body (10) are separable.

17. The fastening according to claim 16, wherein the bondings are separable by means of a vibrating knife with 90° offset blade.

18. The fastening according to claim 17, wherein a renewed adhesive bonding can take place on a bonding separated by means of a vibrating knife.

19. The fastening according to claim 1, wherein a layer of a bonding agent is situated between respective surfaces of the fastening sites in such a fashion that there is no contact between components of the windshield wiper system (32) and the vehicle body (10).

20. The fastening according to claim 1, wherein the windshield wiper system (32) is a wiper system for a front and/or rear window, and/or a headlamp and/or a mirror surface.

21. A fastening for a windshield wiper system on a vehicle body, in particular for motor vehicles, whereby the windshield wiper system comprises a premanufactured assembly having at least one fastening site arranged on it, wherein the at least one fastening site of the windshield wiper system (32) is bonded in each case with a fastening site arranged accordingly on the vehicle body (10), wherein a second fastening site (18) designed with a single-axis compensation of tolerance comprises a U-shaped structural part (28) having one downwardly open side and a correspondingly designed, U-shaped matching part (30) engaged in a positive connection with each other, whereby the fastening site of the windshield wiper system (32) is designed preferably as a U-shaped formed part (28) having one downwardly open side, and the attachment site on the vehicle body (10) is designed as a U-shaped matching piece (30).

* * * * *